United States Patent
Basham et al.

(10) Patent No.: US 6,182,167 B1
(45) Date of Patent: Jan. 30, 2001

(54) AUTOMATIC SHARING OF SCSI MULTIPORT DEVICE WITH STANDARD COMMAND PROTOCOL IN CONJUNCTION WITH OFFLINE SIGNALING

(75) Inventors: Robert Beverley Basham; Leonard George Jesionowski, both of Tucson, AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/176,766

(22) Filed: Oct. 22, 1998

(51) Int. Cl.[7] ............................................. G06F 3/02
(52) U.S. Cl. ........................ 710/38; 710/128; 710/131
(58) Field of Search ................................. 710/131, 128, 710/129, 38

(56) References Cited

U.S. PATENT DOCUMENTS

| | | | |
|---|---|---|---|
| 4,821,170 | 4/1989 | Bernick et al. | 364/200 |
| 4,975,838 | 12/1990 | Mizuno et al. | 364/200 |
| 5,274,773 | 12/1993 | Squires et al. | 395/275 |
| 5,471,634 | 11/1995 | Giorgio et al. | 395/600 |
| 5,566,345 | 10/1996 | Ostrowski | 395/822 |
| 5,596,727 | 1/1997 | Literati et al. | 395/281 |
| 5,805,821 | * 9/1998 | Saxena et al. | 395/200.61 |
| 5,925,120 | * 7/1999 | Arp et al. | 710/131 |

\* cited by examiner

*Primary Examiner*—Thomas C. Lee
*Assistant Examiner*—Harold Kim
(74) *Attorney, Agent, or Firm*—John H. Holcombe; Robert M. Sullivan

(57) ABSTRACT

A method, embodiable in computer readable program code, and a SCSI multiport device allow multiple hosts to be coupled to associated device ports of the multiport device. Using standard SCSI signaling, any host port may reserve the multiport device at its one associated device port. In response to a Reservation command, the multiport device is reserved in accordance with standard SCSI protocol. The method implements, at all the device ports other than the one device port, OFFLINE or status signaling which indicates that the multiport device is unavailable or offline. In response to a Device Reset from the one host port, the method operates the multiport device in accordance with standard SCSI protocol, including resetting the reservation of the multiport device, and additionally maintains the implemented OFFLINE or status signaling. Then, in response to a Release command from the one host port, the reservation of the multiport device is released in accordance with standard SCSI protocol, and additionally the OFFLINE or status signaling is terminated.

16 Claims, 2 Drawing Sheets

AUTOMATIC SHARING OF SCSI MULTIPORT DEVICE WITH STANDARD COMMAND PROTOCOL IN CONJUNCTION WITH OFFLINE SIGNALING

TECHNICAL FIELD

This invention relates to Small Computer Systems Interfaces (SCSI), and specifically to the SCSI interconnection of multiple hosts to a multiport SCSI device.

BACKGROUND OF THE INVENTION

The Small Computer Systems Interface (SCSI), e.g., SCSI-2, is a standardized relationship of commands and responses for communicating across a bus, widely used to couple peripheral devices, such as input and output devices and data storage devices (e.g., disks and tapes), to small and medium-size host computers, including to workstations and personal computers (PCs).

It may be advantageous for more than one host computer to non-concurrently utilize the same data storage device so that the host computers may share the same stored data. Several approaches have been advanced for allowing sharing of the same data storage device.

U.S. Pat. No. 4,975,838, Mizuno et al., describes a duplex, concurrent system with bus connecting units for selectively interconnecting two system busses, each having a memory unit. The specialized bus connecting units are operated under a specialized, non-standard arrangement to switch the connections to allow either system to operate separately, or to be interconnected to each other so that the memory units have the same addresses and are operated simultaneously. Non-concurrent use of the same data cannot be conducted using standard SCSI protocol, and requires coordination of the interconnection process.

U.S. Pat. No. 4,821,170, Bernick et al., provides a multiple-channel direct memory access device I/O controller for arbitrating data bus usage between two host processors by operating latches associated with each of two ports to "grant ownership" of the device controller to one of the ports. Again, the specialized logical interconnection process prevents non-concurrent use of the same data using standard SCSI protocol.

U.S. Pat. No. 5,471,634, Giorgio et al., interfaces a plurality of hosts with a controller which operates a SCSI initiator to interface with a plurality of peripheral target devices. The controller stores the status of each device for all host processors and, when a host requests status, the controller clears its memory for the host for the target. However, the hosts are on the same bus and a specialized host adapter is required to independently and logically connect through the SCSI initiator to a target device.

U.S. Pat. No. 5,596,727, Literati et al., provides gates which enable only one host and only one bank of devices at a time over a SCSI bus. The gates are specifically enabled and disabled, preventing non-concurrent use of the same data using standard SCSI protocol.

Another approach is to simply employ separate SCSI device ports for each of the hosts, allowing the hosts to non-concurrently share the device without requiring the changing of SCSI cables. Typically, under SCSI-2, while both device ports are online, the hosts are treated for the most part as if they were on the same SCSI bus.

This results in the problem that, when the storage device is recovering from a reset condition on one SCSI bus at one port, a host from another SCSI bus at another port may "steal" the storage device. Depending on the status of the device, for example, if a tape cartridge is loaded and ready on the device, the second host may reposition the tape and operate with the tape cartridge to the detriment of the original host.

SUMMARY OF THE INVENTION

It is an object of the present invention to allow multiple hosts to non-concurrently utilize the same multiport device, complying with SCSI standard protocol and using existing host software, while providing protection against other hosts on other ports.

Disclosed are a method, a multiport device, an article of manufacture comprising a computer readable medium having computer readable program code embodied therein, and a computer program product for coupling multiple host ports to a multiport device in a Small Computer Systems Interface (SCSI) system, each host port coupled at an associated device port of the multiport device. The SCSI system has OFFLINE or status signaling which indicates that a device is unavailable or offline, and has standard SCSI protocol device Reservation, device Release, and Device Reset capabilities.

The method comprises initially allowing any host port to reserve the multiport device at an associated one of the device ports of the multiport device. In response to a Reservation command for the multiport device from one of the host ports at the associated one device port, the method reserves the multiport device at the one device port in accordance with standard SCSI protocol, and implements at all the device ports other than the one device port the OFFLINE or status signaling which indicates that the multiport device is unavailable or offline. In one embodiment, the multiport device controller sets all the device ports other than the one device port offline. In response to a Device Reset from the one host port for the associated one device port, the method operates the multiport device in accordance with standard SCSI protocol, including resetting the reservation of the multiport device at the one device port in accordance with standard SCSI protocol, and additionally maintains the implemented OFFLINE signaling. In another embodiment, status signaling is employed to prevent other hosts from gaining the attention of the multiport device.

Then, in response to a Release command from the one host port for the associated one device port, the method releases the reservation of the multiport device in accordance with standard SCSI protocol, and additionally terminates the OFFLINE or status signaling.

Other standard SCSI protocol events than a Release command may be utilized to cause the device to be released. One example may comprise an operator selected Manual Online event.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
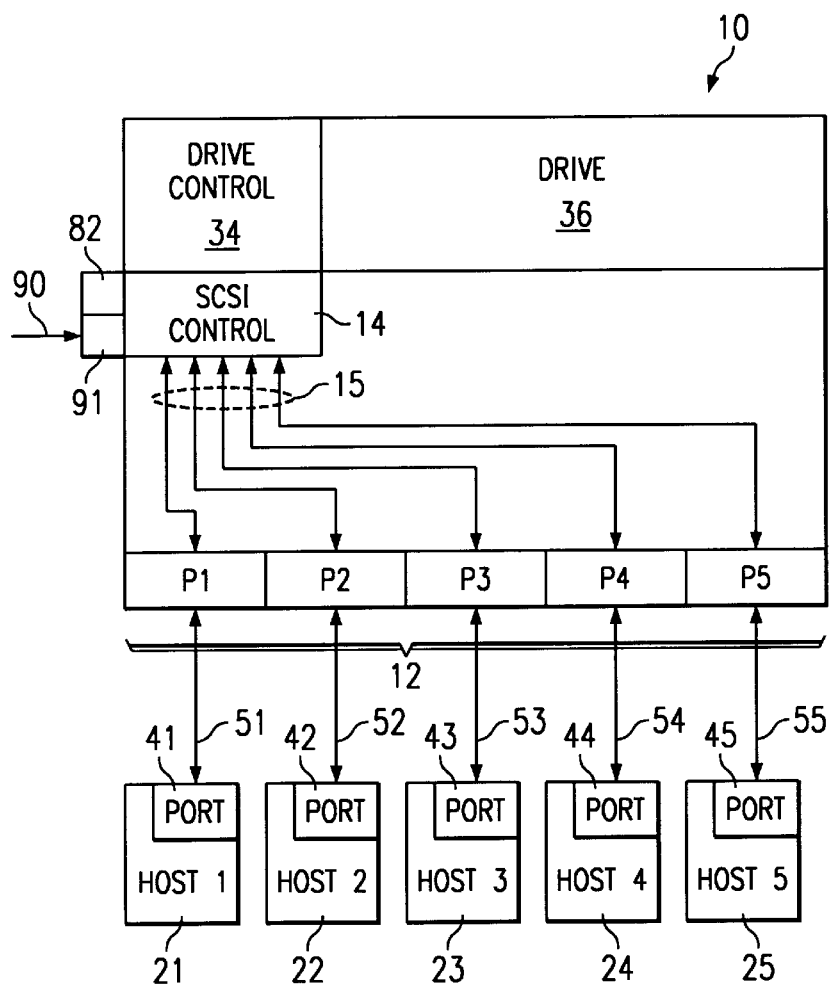
FIG. 1 is a diagrammatic representation of a multiport device coupled to a plurality of hosts in accordance with the present invention.

Referring to FIG. 1, an embodiment of a multiport device 10 in accordance with the present invention is illustrated having a plurality of ports 12, called ports P1–P5. Each of the ports is a standardized Small Computer Systems Interface (SCSI) port which operates under the control of a SCSI controller 14. The SCSI controller 14 may comprise a computer processor system (or microprocessor), such as an IBM Power PC processor. The ports 12 are each coupled to the SCSI controller 14 by means of connections 15.

The multiport device 10 may comprise any type of device that requires coupling to a plurality of hosts, such as hosts 21–25. Examples of such devices include input/output devices such as communication servers, and data storage devices such as disk file arrays or tape or optical data storage drives or libraries. The example illustrated in FIG. 1 is a tape or optical data storage drive 36. A data storage drive 36 loads and reads and/or writes data on a provided portable data storage media, such as magnetic tape cartridges or cassettes, optical disk cartridges, etc., under the control of a drive controller 34. In response to commands from a host 21–25 at ports 12, drive controller 34 operates the data storage drive 36 to read and/or write data on the data storage media.

In accordance with the present invention, each of the hosts 21–25, named, for example, Host H1, Host H2, etc., is separately coupled via its SCSI port 41–45 to a corresponding port 12, for example, Port P1, Port P2, etc., on a separate SCSI bus 51–55.

Figure 2:
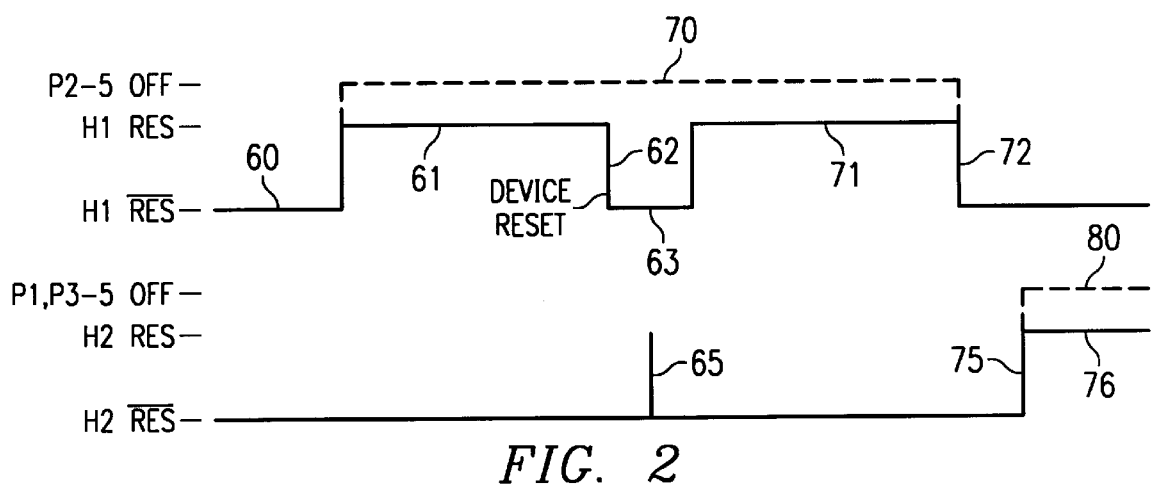
FIG. 2 is a representation of device reservation and offline signaling in accordance with the present invention.

Referring additionally to FIG. 2, with respect to the prior art under SCSI-2, while both device ports are online, the hosts are treated for the most part as if they were on the same SCSI bus. A host, e.g., Host H1, initially not reserving the device 60, may use the SCSI Reserve command to reserve the multiport device 10, shown by line 61. This results in the problem that, when the host orders a Device Reset 62, for example, as part of an error recovery sequence, and when the device 10 is recovering 63 from the reset condition on one SCSI bus at one port, another host from another SCSI bus at another port may issue a SCSI Reserve command 65. Under the existing SCSI protocol, the second host (H2) would "steal" the device 10, possibly before the first host (H1) was completed with the device, leading to manifold difficulties.

The likely sequence of operation of a host is to conduct a job which requires the multiport device 10. The host tries to open the device 10 by first issuing a Reserve command, reserving the device, and then communicating with the device to cause components of the device to accomplish desired functions, such as loading a data storage media, searching for a data set, reading and/or writing data on the data storage media, and unloading the data storage media. Upon completion to the sequence of operations, the host then closes the device 10 by issuing a Release command.

In accordance with the present invention, all device ports 12 are enabled to receive commands from the respective hosts 21–25 at the corresponding host port 41–45. In response to a Reservation command for the multiport device 10 from one of the host ports 41–45 at its associated device port 12, the SCSI controller 14 reserves the multiport device 61 for the requesting host 21–25 in accordance with the standard SCSI protocol. For example, host H1 may request the reservation of the device at port P1, and the SCSI controller 14 reserves device 10. Additionally, in accordance with the present invention, the SCSI controller 14 implements at all the device ports P2–P5 other than the one device port P1, an OFFLINE or status signaling which indicates that the multiport device is unavailable or offline, depicted in FIG. 2 as line 70. Thus, as will be explained, when the Device Reset 62 occurs, and the device 10 is recovering 63 from the reset condition on one SCSI bus at one port, and another host from another SCSI bus at another port may issue a SCSI Reserve command 65, there is, as shown in FIG. 2, no response by the addressed port to the requesting second host, assuring the availabilty of the device 10 for reservation by the first host, shown as 71.

Only upon the first host issuing a Release command 72 or upon an equivalent action, are the other ports 12 made available for a Reserve command from the other hosts. For example, referring to FIG. 2, subsequent to the first reserving host (H1) 21 issuing a Release command 72, a second host (H2) may again issue a Reserve command 75 requesting reservation of the device 10 at device port P2. Since all ports 12 are available, under normal SCSI protocol, the SCSI controller 14 reserves the device 10 for the second host H2, as shown by line 76. Again, in accordance with the present invention, the SCSI controller 14 implements at all the device ports P1 and P3–P5 other than the one device port P2 an OFFLINE or status signaling which indicates that the multiport device is unavailable or offline, depicted in FIG. 2 as line 80.

Other actions that will result in the SCSI controller releasing the reserved device at the device port and making all other device ports available may include an operator selected Manual Online event.

Figure 3:
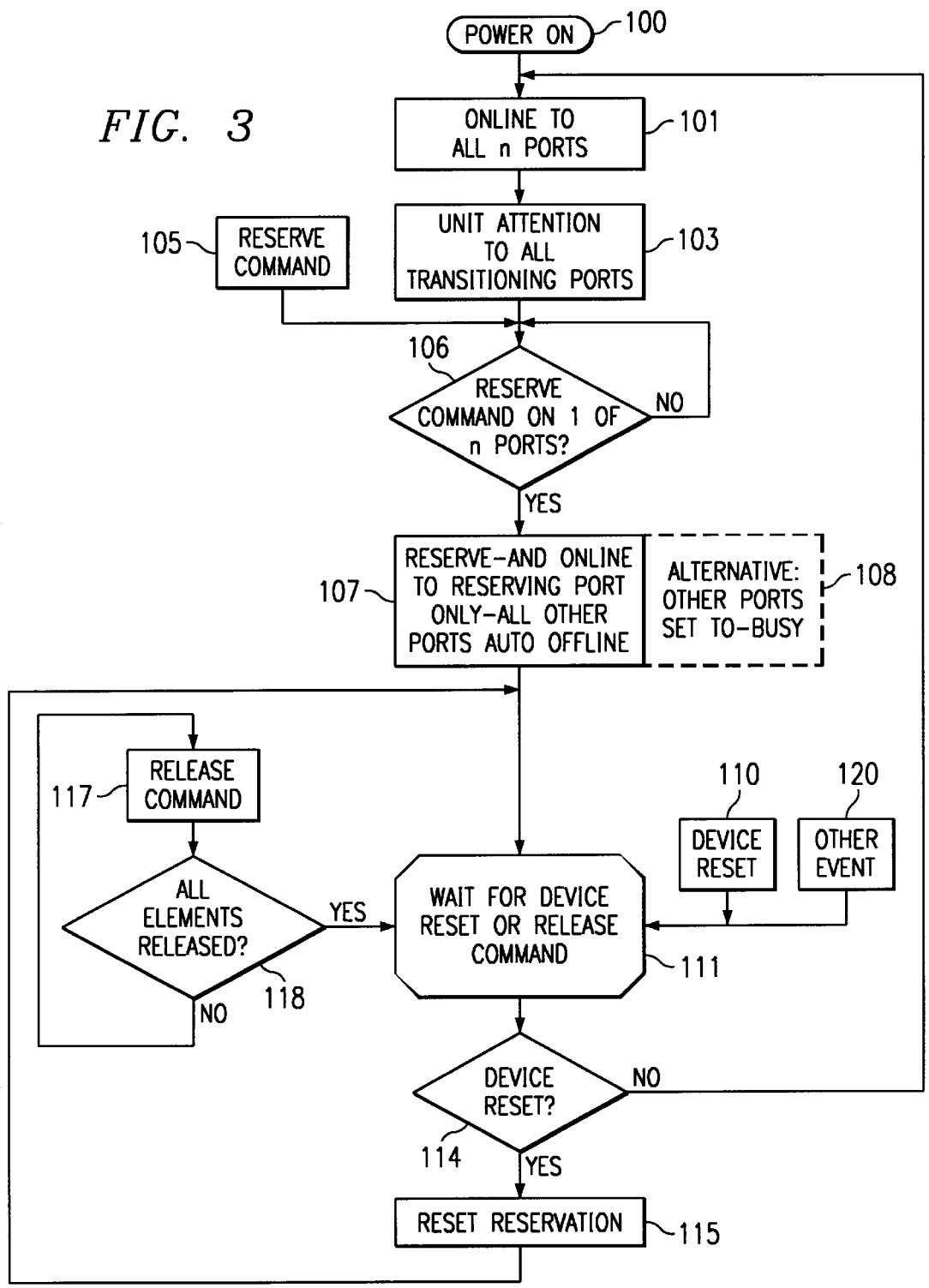
FIG. 3 is a flow chart depicting the method of the present invention.

FIG. 3 illustrates an embodiment of the method of the present invention. Preferably, each of the functions and capability described is conducted by a processor in accordance with computer readable program code.

Figure 4:
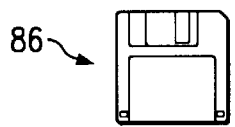
FIG. 4 is an illustration of a storage medium for storing computer executable instructions.

Referring to FIGS. 1 and 4, the computer readable program code of a computer program product(s) may be supplied at an I/O station 82 from a storage medium 86 which stores executable computer instructions. The illustrated example of a storage medium which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied electronically, as from a network 90 at a communications interface 91. In the embodiment of FIG. 1, the computer readable program code operates the SCSI controller 14, through its computer processor or microprocessor.

Referring to FIGS. 1 and 3, the SCSI controller 14 is initially powered on in step 100. At the initial power on, all ports 12 are initially offline. Thus, in step 101, all (n) device ports 12 are set to be ONLINE and currently available. Upon all n ports 12 set to the ONLINE state, a UNIT ATTENTION is provided in step 103 to all transitioning ports (ports that were offline, in this case all n ports) so that all ports are available to respond to commands from the associated host ports 41–45.

In accordance with standard SCSI protocol, one of the hosts 21–25 may then issue a Reserve command for the device 10 at its host port which is received at the associated device port 12, as shown in step 105. Step 106 determines whether a Reserve command has been received at one of the n ports 12. If "NO", the process loops back to step 106 after a suitable delay. If "YES", the method moves to step 107.

In the embodiment of the present method illustrated in FIG. 3, step 107 reserves the device 10 for the first requesting host 21–25. Using the example of FIG. 2, host H1 is the first requesting host and the associated device port P1 receives the Reserve command and reserves the device 10 for the host H1.

Still referring to FIGS. 1 and 3, in accordance with the present invention, the SCSI controller 14 of the multiport device 10, in step 107, additionally sets all the device ports other than the one device port OFFLINE. This operation causes the SCSI port chips to be disabled. Again using the example of FIG. 2, the SCSI controller 14 causes device ports P2–P5 automatically to be disabled and set OFFLINE, leaving only device port P1 ONLINE. As device ports P2–P5 are OFFLINE, device 10 is effectively preventing from answering any commands from hosts H2–H5. As such, this is a "hard" protection preventing communication between the device ports P2–P5 and the hosts H2–H5, and is illustrated as line 70 in FIG. 2.

Still in accordance with the present invention, less drastic alternatives are illustrated in step 108. Specifically, the device ports and device 10 are set to still answer the associated. hosts, providing a "soft" protection by providing standard SCSI protocol status signaling, such as BUSY status. Other standard SCSI signaling may be envisioned by those of skill in the art which will also prevent a second requesting host from "stealing" the device 10.

In response to a Device Reset from the one host port for the associated one device port, illustrated as step 110, the method operates the multiport device in accordance with the standard SCSI protocol. Step 111 is a loop which waits for a Device Reset or other events to be described hereinafter. In the example of FIG. 2, the first requesting host H1 issues the Device Reset 62 in accordance with standard SCSI protocol.

In accordance with the present invention there will be no response by device 10 to any command from any of the other hosts H2–H5, such as Reserve command 65.

Still referring to FIGS. 1 and 3, the Device Reset is detected in step 114, "YES", and is treated in accordance with standard SCSI protocol, and, in step 115, the Reservation by host H1 of the multiport device 10 is reset at the one device port in accordance with standard SCSI protocol. Additionally, step 107 stays in place and maintains the implemented OFFLINE or status signaling.

Then, in response to a Release command from the one host port for the associated one device port, illustrated as step 117, and for the specific embodiment of FIG. 1 or a similar multiport device which has a plurality of separate components which may be utilized by a host, such as the drives and the library controller, step 118 comprises a check to make sure that all of the elements of the device 10 have been released. If "NO", the Release command is applied only to the specifically released component of device 10, and the process loops back to step 117 for another Release command.

If all elements have been released, "YES", the Release command is provided to step 111. Step 114 indicates, "NO", that this is not a Device Reset, and the method releases the reservation of the multiport device in accordance with standard SCSI protocol, and additionally terminates the OFFLINE or status signaling. Specifically, the method loops to step 101 which sets all (n) device ports 12 to be ONLINE and currently available. In the example of FIG. 2, the Release command terminates 72 the auto OFFLINE or status protection 70. Thus, another host, e.g., host H2, may then submit a Reserve command 75 at step 105 and the SCSI controller 14 will conduct steps 106 and 107 or 108 to set all the device ports P1 and P3–PS other than the one device port P2 OFFLINE, or implements a BUSY status at the other device ports, as shown by line 80.

Other events that may be recognized by the SCSI controller 14 and which terminate the OFFLINE or status signaling are illustrated in FIG. 3 as step 120. Step 120 may comprise events, such as a POWER ON or a MANUAL ONLINE event selected by an operator which, in SCSI protocol, resets and releases the device 10 and, as the result, requires a termination of the OFFLINE or status signaling.

Thus, step 111 recognizes the Release command 117 or another event 120, and, as it is not a Device Reset, step 114 loops to step 101 which sets all (n) device ports 12 to be ONLINE and currently available.

Those of skill in the art will understand that the objective of the present invention is to stay within existing host software by using only standard SCSI Reserve and Release commands, and to close a difficulty with the SCSI standard without changing the host software. Only the SCSI controller computer readable program code is changed in accordance with the invention. Thus, other, similar SCSI standard commands may be envisioned which may be similarly utilized in accordance with the invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a Small Computer Systems Interface (SCSI) system multiport device, said SCSI system having OFFLINE or status signaling which indicates that a device is unavailable or offline, and having standard SCSI protocol device Reservation, device Release, and Device Reset capabilities, the method for coupling multiple host ports to said multiport device, each at an associated device port of said multiport device, comprising the steps of:

initially allowing any said host port to reserve said multiport device at an associated one of said device ports of said multiport device;

responding to a Reservation command for said multiport device from one of said host ports at said associated one device port, reserving said multiport device at said one device port in accordance with said standard SCSI protocol, in conjunction with implementing at all said device ports other than said one device port said OFFLINE or status signaling which indicates that said multiport device is unavailable or offline;

responding to a Device Reset from said one host port for said associated one device port, by operating said multiport device in accordance with said standard SCSI protocol, including resetting said reservation of said multiport device at said one device port in accordance with said standard SCSI protocol, and by maintaining said implemented OFFLINE or status signaling; and responding to a Release command from said one host port for said associated one device port, by releasing said reservation of said multiport device in accordance with said standard SCSI protocol, and by terminating said OFFLINE or status signaling.

2. The method of claim 1, wherein said step of implementing said OFFLINE or status signaling comprises setting offline all said device ports other than said one device port, thereby preventing any of said host ports other than said one host port from communicating with said multiport device under said standard SCSI protocol during said OFFLINE signaling.

3. The method of claim 1, wherein said step of implementing said OFFLINE or status signaling comprises setting a status signal to BUSY status for all said device ports other than said one device port.

4. The method of claim 1, wherein said releasing step is additionally responsive to other events, including a Power On and a Manual Online operator selection.

5. A multiport device for a Small Computer Systems Interface (SCSI) system, said SCSI system having OFFLINE or status signaling which indicates that a device is unavailable or offline, and having standard SCSI protocol device Reservation, device Release, and Device Reset capabilities, said multiport device comprising:

a plurality of device ports, each said device port adapted for coupling to a single associated host port; and a SCSI controller, said controller
  a) initially allowing any coupled said host port to reserve said multiport device at an associated one of said device ports;
  b) responding to a Reservation command for said multiport device from one of said host ports at said associated one device port, reserving said multiport device at said one device port in accordance with said standard SCSI protocol, in conjunction with implementing at all said device ports other than said one device port said OFFLINE or status signaling which indicates that said multiport device is unavailable or offline;
  c) responding to a Device Reset from said one host port for said associated one device port, by operating said multiport device in accordance with said standard SCSI protocol, including resetting said reservation of said multiport device at said one device port in accordance with said standard SCSI protocol, and by maintaining said implemented OFFLINE or status signaling; and
  d) responding to a Release command from said one host port for said associated one device port, by releasing said reservation of said multiport device in accordance with said standard SCSI protocol, and by terminating said OFFLINE or status signaling.

6. The multiport device of claim 5, wherein said SCSI controller b) implements said OFFLINE or status signaling by setting offline all said device ports other than said one device port, thereby preventing any of said host ports other than said one host port from communicating with said multiport device under said standard SCSI protocol during said OFFLINE signaling.

7. The multiport device of claim 5, wherein said SCSI controller b) implements said OFFLINE or status signaling by setting a status signal to BUSY status for all said device ports other than said one device port.

8. The multiport device of claim 5, wherein said SCSI controller d) additionally responds to other events, including Power On and a Manual Online operator selection, for releasing said reservation of said multiport device in accordance with said standard SCSI protocol, and for terminating said OFFLINE or status signaling.

9. An article of manufacture comprising a computer readable medium having computer readable program code embodied therein for operating a computer processor of a Small Computer Systems Interface (SCSI) multiport device in a SCSI system, said SCSI system having OFFLINE or status signaling which indicates that a device is unavailable or offline, and having standard SCSI protocol device port Reservation, device Release, and Device Reset capabilities, comprising:

computer readable program code which causes said computer processor to initially allow any said host port to reserve said multiport device at an associated one of said device ports of said multiport device;

computer readable program code which causes said computer processor to respond to a Reservation command for said multiport device from one of said host ports at said associated one device port, reserving said multiport device at said one device port in accordance with said standard SCSI protocol, in conjunction with implementing at all said device ports other than said one device port said OFFLINE or status signaling which indicates that said multiport device is unavailable or offline;

computer readable program code which causes said computer processor to respond to a Device Reset from said one host port for said associated one device port, by operating said multiport device in accordance with said standard SCSI protocol, including resetting said reservation of said multiport device at said one device port in accordance with said standard SCSI protocol, and by maintaining said implemented OFFLINE or status signaling; and computer readable program code which causes said computer processor to respond to a Release command from said one host port for said associated one device port, by releasing said reservation of said multiport device in accordance with said standard SCSI protocol, and by terminating said OFFLINE or status signaling.

10. The article of manufacture of claim 9, wherein said computer readable program code which causes said computer processor to implement said OFFLINE or status signaling comprises setting offline all said device ports other than said one device port, thereby preventing any of said host ports other than said one host port from communicating with said multiport device under said standard SCSI protocol during said OFFLINE signaling.

11. The article of manufacture of claim 9, wherein said computer readable program code which causes said computer processor to implement said OFFLINE or status signaling comprises setting a status signal to BUSY status for all said device ports other than said one device port.

12. The article of manufacture of claim 9, wherein said computer readable program code which causes said computer processor to release said reservation additionally responds to other events including a Power On and a Manual Online operator selection.

13. A computer program product usable with a programmable computer having computer readable program code embodied therein for operating a computer processor of a Small Computer Systems Interface (SCSI) multiport device in a SCSI system, said SCSI system having OFFLINE or status signaling which indicates that a device is unavailable or offline, and having standard SCSI protocol device Reservation, device Release, and Device Reset capabilities, comprising:

computer readable program code which causes said computer processor to initially allow any said host port to reserve said multiport device at an associated one of said device ports of said multiport device;

computer readable program code which causes said computer processor to respond to a Reservation command for said multiport device from one of said host ports at said associated one device port, reserving said multiport device at said one device port in accordance with said standard SCSI protocol, in conjunction with implementing at all said device ports other than said one device port said OFFLINE or status signaling which indicates that said multiport device is unavailable or offline;

computer readable program code which causes said computer processor to respond to a Device Reset from said one host port for said associated one device port, by operating said multiport device in accordance with said standard SCSI protocol, including resetting said reservation of said multiport device at said one device port in accordance with said standard SCSI protocol, and by maintaining said implemented OFFLINE or status signaling; and computer readable program code which causes said computer processor to respond to a Release command from said one host port for said associated one device port, by releasing said reservation of said multiport device in accordance with said standard SCSI protocol, and by terminating said OFFLINE or status signaling.

14. The computer program product of claim 13, wherein said computer readable program code which causes said computer processor to implement said OFFLINE or status signaling comprises setting offline all said device ports other than said one device port, thereby preventing any of said host ports other than said one host port from communicating with said multiport device under said standard SCSI protocol during said OFFLINE signaling.

15. The computer program product of claim 13, wherein said computer readable program code which causes said computer processor to implement said OFFLINE or status signaling comprises setting a status signal to BUSY status for all said device ports other than said one device port.

16. The computer program product of claim 13, wherein said computer readable program code which causes said computer processor to release said reservation additionally responds to other events, including a Power On and a Manual Online operator selection.

* * * * *